Patented Sept. 29, 1931

1,824,963

UNITED STATES PATENT OFFICE

JULIUS A. NIEUWLAND, OF NOTRE DAME, INDIANA, ASSIGNOR TO E. I. DU PONT DE NEMOURS & COMPANY, OF WILMINGTON, DELAWARE, A CORPORATION OF DELAWARE

ACETALS OF ALKYL ETHERS OF POLYETHYLENE GLYCOLS

No Drawing. Application filed September 13, 1928. Serial No. 305,867.

This invention relates to the preparation of acetals, and more particularly to the preparation of acetals from alcohols substituted with more than one ether group.

It is an object of this invention to produce a new class of compounds containing ether groups, these compounds having in general the following graphical formula:

$$CH_3CH(OCH_2CH_2OCH_2CH_2OR)_2,$$

where R is an alkyl radical or an ethyl alkyl ether attached through the beta carbon of the ethyl group.

I have found that such compounds can be produced by treating the corresponding alkyl alcohols with acetylene in the presence of suitable catalysts, such as mercuric salts of anhydrous fluo-acids.

A specific example illustrating the preparation of the acetal of the ethyl ether of diethylene glycol is as follows:

A 20% solution of fluoboric acid in ethyl alcohol weighing 10 grams is warmed with two grams of mercuric oxide until a portion of the mercuric oxide has gone into solution. To this catalyst mixture is then added 200 grams of the ethyl ether of diethylene glycol, and acetylene is passed in until an increase in weight of 20 grams occurs, corresponding to the absorption of one-half gram mole acetylene per gram mole of the ethyl ether of diethylene glycol. When the rate of the reaction decreases, additional mercuric oxide is added in two gram portions, not more than 10 to 12 grams being required for a charge of this size. On the completion of the reaction the product is neutralized with saturated potassium carbonate solution, dried with anhydrous potassium carbonate, and distilled yielding the acetal in a high state of purity.

The product is a water white liquid with a boiling point of approximately 140 to 145° C. under 14 mm. pressure, having the following structural formula:

$$CH_3.CH(O.CH_2.CH_2.O.CH_2.CH_2.O.C_2H_5)_2$$

The acetals of other ethers of diethylene glycol, such as the methyl, propyl, butyl and benzyl ethers, can be prepared in a similar way by adding acetylene in molecular proportions to the corresponding ethers of diethylene glycol. The acetals of ethers of triethylene glycol can also be prepared in the manner indicated, using the corresponding ethers of triethylene glycol.

The preparation of compounds of this class by the method indicated above is not limited to the use of mercuric salts of fluoboric acid but mercuric salts of other acids, such as fluosilicic acid, may be used. Likewise, any of the standard methods for the preparation of acetals can be used instead of the particular method indicated above.

Acetals of the type set forth herein have been found to be excellent plasticizers for cellulose derivatives, but their use in that connection is not claimed herein as it forms the subject matter of copending application of Walter E. Lawson, Serial Number 305,873, filed September 13, 1928, and allowed January 3, 1931.

As many apparently widely different embodiments of this invention may be made without departing from the spirit and scope thereof, it is to be understood that I do not limit myself to the specific embodiments thereof except as defined in the appended patent claims.

I claim:

1. Compounds having the following graphical formula:

$$CH_3CH(OCH_2CH_2OCH_2CH_2OR)_2,$$

where R is an alkyl radical or an ethyl alkyl ether attached through the beta carbon of the ethyl group.

2. As a new compound, an acetal of an alkyl ether of a polyethylene glycol.

3. As a new compound, an acetal of an ethyl ether of a polyethylene glycol.

4. As a new compound, an acetal of an alkyl ether of diethylene glycol.

5. As a new compound, the acetal of the ethyl ether of diethylene glycol.

6. A compound obtainable by the action of acetylene on an alkyl ether of diethylene glycol.

7. The method of reacting an alkyl alcohol containing more than one ether group with acetylene consisting in treating said alkyl alcohol with acetylene in the presence of a catalyst consisting of a mercuric salt of a fluo-acid.

8. The method of preparing the acetal of the ethyl ether of diethylene glycol which consists in adding 200 parts by weight of the ethyl ether of diethylene glycol to a catalyst made from 10 parts by weight of a 20% solution of fluoboric acid in ethyl alcohol which has been warmed with 2 parts by weight of mercuric oxide, in passing acetylene into this mixture until an increase of weight corresponding to the absorption of one-half part by weight mole acetylene per part by weight mole of the ethyl ether of diethylene glycol has occurred, and in adding additional mercuric oxide when the rate of reaction decreases.

In testimony whereof, I affix my signature.

JULIUS A. NIEUWLAND.